United States Patent [19]
Stecker

[11] Patent Number: 6,150,009
[45] Date of Patent: Nov. 21, 2000

[54] DECORATIVE STRUCTURAL PANEL

[75] Inventor: William M. Stecker, Chapel Hill, N.C.

[73] Assignee: Surface Technologies, Inc., Durham, N.C.

[21] Appl. No.: 09/131,142

[22] Filed: Aug. 7, 1998

[51] Int. Cl.$^7$ ...................................................... B32B 27/14
[52] U.S. Cl. ........................ 428/198; 428/195; 428/212; 428/201; 428/210; 428/209; 428/213; 428/423.1; 428/500; 156/230
[58] Field of Search ..................... 428/195, 212, 428/201, 210, 209, 213, 423.1, 500, 198; 156/230

[56] References Cited

U.S. PATENT DOCUMENTS

| | | | |
|---|---|---|---|
| 3,811,915 | 5/1974 | Burrell et al. | 117/45 |
| 4,198,457 | 4/1980 | Saito et al. | 428/161 |
| 4,393,108 | 7/1983 | Barker et al. | 428/44 |
| 4,531,157 | 7/1985 | Schmidt et al. | 427/262 |
| 4,652,482 | 3/1987 | Diesel et al. | 428/151 |
| 4,971,840 | 11/1990 | Bohó et al. | 427/397 |
| 5,089,351 | 2/1992 | Baarns | 428/488 |
| 5,634,279 | 6/1997 | Ma et al. | 728/174 |
| 5,654,039 | 8/1997 | Wenzel et al. | 427/391 |
| 5,720,839 | 2/1998 | Takahashi et al. | 156/230 |

FOREIGN PATENT DOCUMENTS

| | | |
|---|---|---|
| 0 621 575 A1 | 3/1994 | European Pat. Off. . |
| 2 469 263 | 11/1979 | France . |
| 60-145824 | 8/1985 | Japan . |
| 60-224512 | 11/1985 | Japan . |
| 62-149425 | 3/1987 | Japan . |
| 63-295255 | 12/1988 | Japan . |
| 02159201 | 6/1990 | Japan . |
| WO97/03847 | 2/1997 | WIPO . |

*Primary Examiner*—William Krynski
*Assistant Examiner*—B. Shewareged
*Attorney, Agent, or Firm*—Myers, Bigel, Sibley & Sajovec, P.A.

[57] ABSTRACT

Decorative structural panels have a release material of wax, silicone, or oil applied to portions of a substrate surface. One or more curable thermosetting resins are applied on top of the release material and substrate surface and allowed to commingle. The surface tension of each resin is greater than that of the release material such that the resin or resins are pulled away from the release material prior to curing to produce a fish-eye appearance having a strong and durable finish.

11 Claims, 3 Drawing Sheets

DECORATIVE STRUCTURAL PANEL

FIELD OF THE INVENTION

The present invention relates generally to decorative structural panels and, more particularly, to surface coatings for decorative structural panels.

BACKGROUND OF THE INVENTION

In the surface coatings industry, the tendency of liquid coatings to "fish-eye" or pull away from waxy or oily contaminants on a surface is known and is typically undesirable. This phenomenon is caused by different surface energies of the coatings and contaminants. High molecular weight liquids with high surface tension are especially prone to fish-eye. Accordingly, surface preparation in the coatings industry may involve solvent dips and mechanical preparation to rid a surface to be coated of unwanted contaminants. Also, material, such as silicone, may be added to a coating to reduce the surface tension of the coating and, thus, the tendency of the coating to fish-eye.

Printing methods utilizing ink containing a very small amount of silicone to distort and enhance images are known. For example, U.S. Pat. No. 3,811,915 to Burrell et al. describes a printing method for producing simulated wood grain on a substrate. Ink containing between about 0.1% and 3.0% by weight silicone is applied to the substrate in a pattern. A conventional top coat of material which tends to be repelled by the silicone, such as lacquer, is applied over the ink forming a three-dimensional grained or patterned effect.

U.S. Pat. No. 4,532,157 to Schmidt et al. describes a printing method for producing paper sheets having a three-dimensional surface structure. An aqueous ink containing a lacquer-repelling material is applied to a paper sheet. An aqueous lacquer is applied over the ink to produce a three-dimensional effect.

U.S. Pat. No. 4,652,482 to Diesel et al. describes producing colored films of paper having a three-dimensional effect. Paper films are printed with an aqueous ink containing lacquer-repelling material, followed by a coating of lacquer thereover.

U.S. Pat. No. 5,089,351 to Baarns describes a process for creating a work of art wherein crayon is applied to a paper surface followed by the application of ink.

U.S. Pat. No. 4,393,108 to Barker et al. describes a process for producing a decorative simulated ceramic tile. A substrate is coated with a colored material to produce a printable base. Ink containing silicone is applied to the printable base in a clearly visible pattern. A translucent top coat of pigment-containing material is applied over the ink pattern.

Unfortunately, the types of aesthetically pleasing surfaces produced using these ink and lacquer techniques are somewhat limited. The systems described above are limited to discrete aesthetics where an ink image is sharp and distinct. Only Barker et al. softens an ink image with the use of a single semi-transparent material. None of the systems describe chaotic or subtle co-mingling of colors and textures. Furthermore, the systems described above utilizing printing techniques are limited to pressure transfer systems. Articles produced using the above techniques may not have a strong and durable finish which may be necessary for various applications, such as wall panels, counter tops, tabletops, tiles, containers, moldings, furniture, and the like.

SUMMARY OF THE INVENTION

It is therefore an object of the present invention to produce decorative structural panels having a strong and durable finish with an aesthetically appealing fish-eye appearance.

It is another object of the present invention to produce decorative structural panels having an aesthetically appealing fish-eye appearance with multiple colors.

These and other objects of the present invention are provided by a decorative article of manufacture having a release material or release image applied to portions of a substrate surface, and one or more curable thermosetting resins applied to the release material and portions of the substrate surface not covered by the release material. Suitable substrates may be formed from wood, plastic, and metal. Various patterns may be formed in the substrate surface to enhance the aesthetic appeal of the decorative article. Each resin has a surface tension greater than that of the release material. Accordingly, the resin or resins are "pulled away" from the release material prior to curing to produce a fish-eye appearance. The release material may be selected from wax, oil, and silicone products. The release material may be applied to the substrate surface in a pattern or in a random fashion.

According to another aspect of the present invention, steps for producing a decorative article include: providing a prepared substrate surface; applying a release material to the substrate surface; applying one or more curable resins having surface tension greater than the surface tension of the release material on top of the release material; and commingling and curing the resins. For a more pronounced fish-eye effect, the difference in surface tension between a resin and release material can be increased. For a less pronounced fish-eye appearance, the difference in surface tension between a resin and release material can be decreased. A wear-resistant top layer may be applied for durability.

Each resin may have a respective color and may include various fillers and materials. The release material may be selected from various wax, oil, and silicone products and can be applied in various ways. Furthermore, the release material may be applied as a pattern or in a random fashion. Each resin may also be a thermosetting resin selected from the group consisting of unsaturated polyesters, acrylics, epoxies, phenolics and polyurethanes, and blends and mixtures thereof. Polymerization may take place via free radical polymerization, ultra-violet radiation, and the like. The release material is typically less than about 0.1 thousandths of an inch in applied thickness.

Decorative structural panels, according to the present invention are particularly well-suited for use in walls, floors, countertops, and the like.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 1A, 1B:
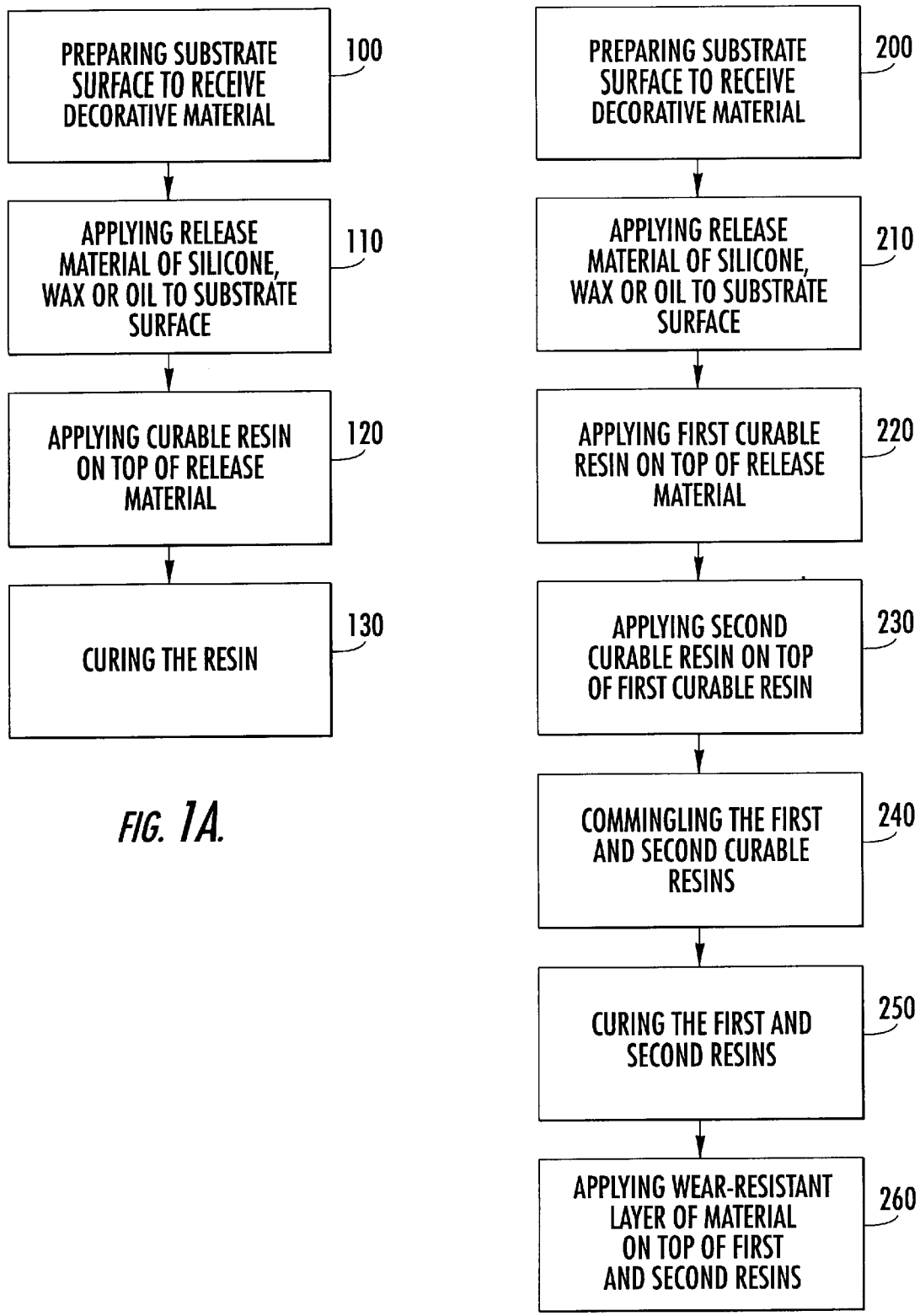
FIGS. 1A–1B schematically illustrate steps for making a decorative article of manufacture, according to several aspects of the present invention.

Referring now to FIGS. 1A–1B, steps for making a decorative article of manufacture, according to several aspects of the present invention, are illustrated. According to one aspect illustrated in FIG. 1A, steps include: preparing a substrate surface to receive decorative material thereon (Block 100); applying release material of silicone, wax or oil to substrate surface (Block 110); applying curable resin on top of release material (Block 120); and curing the resin (Block 130). According to another aspect of the present invention illustrated in FIG. 1B, steps include: preparing a substrate surface to receive decorative material thereon (Block 200); applying release material of silicone, wax or oil to substrate surface (Block 210); applying a first curable resin on top of release material (Block 220); applying a second curable resin on top of the first curable resin (Block 230); commingling the first and second curable resins (Block 240); curing the first and second resins (Block 250); and applying a wear-resistant layer of material on top of the first and second resins (Block 260). These steps will now be described in detail hereinbelow.

Preparing Substrate Surface

A substrate upon which a decorative article can be produced, according to the present invention, may be formed from virtually any substantially non-porous material, such as metal, plastic, wood, paper, glass, paint, and the like. The substrate surface may have one or more colors.

The substrate surface to receive the various decorative materials thereon may be prepared in a variety of ways. The substrate surface may be subjected to conditions sufficient to produce a smooth surface (e.g., sanding with abrasives having 150 grit, or finer, abrasive). Alternatively, the substrate may be subjected to conditions sufficient to produce a generally rough surface (e.g., sanding with abrasives having 150 grit, or coarser, abrasive). A scratch or abrasive pattern may be formed in the substrate surface via various known techniques including, but not limited to conventional sanding, embossing, and abrasive blasting techniques. Fibrous surfaces such as wood-based composite boards, and the like, may also have rough surfaces sufficient for use with the present invention. In addition, solvents may be utilized to prepare the substrate surface as desired.

The present invention is not limited to planar substrates. Various non-planar surface shapes may be utilized without departing from the spirit and intent of the present invention. For example, the present invention may be utilized on the curved surface of glass bottles.

Applying Release Material to Substrate Surface

A coating of release material is applied to the prepared substrate surface. The release material is selected to substantially repel the resin materials overlying the release material. Accordingly, different release materials may be selected depending on the resin materials utilized. Exemplary release materials include, but are not limited to silicone, oil, and wax. Particularly preferable are waxes in the carnauba wax family.

The release material may be applied in a pattern or in a random manner. Various application methods may be utilized for applying the release material to the substrate surface. For example, a pattern of release material may be applied to the substrate surface via a rubber, felt or composite platen. The platen may be planar, cylindrical, or other non-planar shape. Alternatively, the release material may be applied by various artistic methods, including, but not limited to, selective "ragging", spattered spraying, silk screening, and the like.

Preferably, the release material is applied via a volatile solvent, such as naphtha, which serves as a vehicle for adhesively transferring the release material to the substrate surface. The solvent is allowed to flash off prior to the application of resin material, as described below. A very thin coating of release material is utilized. The release material is typically colorless, and is generally invisible after application. The release material is applied with a thickness of typically less than 0.0005 inches, and preferably less than 0.0001 inches.

Applying and Commingling Curable Resins On Top of Release Material

One or more layers of curable resin may be applied to the substrate surface after the release material is applied thereto. The resin may be applied in various ways, including, but not limited to, spraying and rolling. Each resin material preferably has a viscosity and a surface tension that is greater than that of the release material. Accordingly, the resin "pulls" away from the release material to provide interesting patterns and configurations. Each resin applied may have a different color.

When more than one resin is applied in an uncured state (or a partially cured state), the plurality of resins commingle to provide further aesthetic characteristics. Various pigments within each resin may enhance the aesthetic quality, as well. For example, the use of metal flake and pearlescent pigment can provide molten-metal and jewel-like surfaces, respectively. When metal flakes are added to one or more of the resins, the metal flakes migrate to the top of the resin, with pigment color forming diffused boundaries adjacent to the release material. The commingling of pigments may be similar in richness to the glazes in ceramic pottery or jewelry because of the chaotic blending effects that are possible.

Although a variety of resin materials will function satisfactorily, the resin materials should preferably be thermosetting resins. The term "thermosetting resin" relates to a polymer that solidifies or "sets" irreversibly on heating. Suitable thermosetting resins include polyesters, epoxies, urethanes, or any other similar resins preferably having various volatile components which cure without releasing solvents and/or gases therein. It is recognized that some polymers although technically "thermoplastics" could be used in the present invention with the proviso that they do not flow under conditions to which the article is typically subjected. Exemplary polymers of this type are the acrylics and vinyls.

The preparation of curable thermosetting resins is well known in the art and generally involves mixing resins with various filler materials, fiber reinforcement, appropriate initiators and catalysts, and desired tinting or pigment materials, referred to as a resin system. Filler materials may be selected to impart desired properties to a thermosetting resin. Each resin preferably has a different color pigment mixed therein.

The thermosetting resins useful herein can vary and include unsaturated polyesters, phenolics, epoxies, polyurethanes, and the like, and mixtures and blends thereof.

Unsaturated polyester resins are a particularly preferred resin. Useful unsaturated polyester resins include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexandediol, 1,7-heptanediol, 1,8-octanediol, 1,9-nonanediol, 1,10-decanediol, 2,10-decanediol, 1,4-cyclohexandediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3-3,-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like. A preferred resin is Polylite® manufactured by Reichhold Chemicals, Durham, N.C.

The amount of polyester thermosetting resin in the resin system ranges from about 35 percent to about 100 percent by weight of the total resin system. The amount of crosslinking monomer is about 10 percent to about 65 percent by weight of the resin system.

The polyester resin can also be mixed or blended with other thermosetting resins. For example, the polyester resin can be mixed with a crosslinking polyurethane such as described in U.S. Pat. No. 4,062,826 to Hutchinson et al., the disclosure of which is incorporated herein by reference. Polymerization of this mixture can occur by a condensation reaction. A homogenous mixture of an unsaturated polyester resin and a crosslinkable polyurethane precursor having at least one free isocyanate group to react with the end groups of the polyester resin is formed. For example, a crosslinkable polyurethane comprising at least one polyfunctional compound containing groups reactive with isocyanate groups and at least one polyisocyanate can be used. The isocyanate is activated by the first reaction conditions and the chain extension reaction takes place to partially polymerize the resin blend to a semi-solid mass. Exemplary polyisocyanates include methylene di-p-phenylene isocyanate ("MDI") isophorone diisocyanate ("IPDI") and toluene diisocyanate ("TDI"). The second reaction conditions can be activating additional polyisocyanate to fully polymerize the resin blend or can be activating a free radical initiator in the blend to fully polymerize the same. The use of other thermosetting resins will be within the skill of one in the art.

Exemplary room temperature free radical initiators include hydrogen peroxide and methyl ethyl ketone peroxide ("MEKP") noting that most commercially available MEKP includes some hydrogen peroxide.

Exemplary peroxy-type free radical polymerization initiators are the hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. Also azo promoters such as azobisbutrylnitrile can be used. The amount of first and second curing agents used is dependent on the time desired for thermosetting, but is typically a short period of time (i.e., less than 3 hours, typically less than 2 hours and often less than 1 hour). The amount used is about 0.01 to about 0.1 percent by weight of the first curing agent and about 0.1 to about 5 percent by weight of the second curing agent.

As previously noted, the resin system can also include various additives commonly employed in thermosetting resin compositions such as fillers, surfacing agents, colorants, veining pigments, thixotropic agents, and other additives for imparting desirable properties such as hardness, color, flame retardancy, aesthetic appearance, smoothness, clarity and the like. Additionally, resins may be selected having a degree of translucency allowing the colors of other resins used to be visible. A variety of desired aesthetic characteristics can be achieved by selecting resins having different colors and properties, as would be understood by those having skill in the art.

Exemplary fillers can include, among others, aluminum trihydrate, quartz powder, marble powder, crushed silica, calcium carbonate, clay, powdered metals, metal flakes, mixtures thereof and other mineral and inorganic particulates that contribute to the aesthetics of the final article.

Various colorants and veining pigments can be added for purposes of providing background color and other aesthetically pleasing features to the resin system and shaped article. For example, tinting pigments such as titanium dioxide and the like can be added. The amount used is typically less than about 3 percent by weight.

Thixotropic agents are agents which cause the viscosity of the resin system to vary as a function of its state of agitation and the previous history of motion within the fluid. Generally, the viscosity of a thixotropic fluid decreases as its state of agitation and length of agitation increases, and increases as its state of agitation and length of agitation decreases. An exemplary thixotropic agents is fumed silica. The amount used is typically less than about 1 percent by weight.

Curing the Resin

Curing the resins preferably takes place using conventional techniques, as described in the above-referenced U.S.

Pat. No. 5,166,230 to Stecker, the disclosure of which is incorporated herein by reference in its entirety. Curing may occur at room temperature, for example between about 15° C. and 38° C., or at elevated temperatures, for example, between about 100° C. and 150° C. The specific curing temperature and curing time may vary from the above and will depend upon the particular resin or resins and is information which is well known in the art. In addition, curing may take place via ultra-violet radiation (UV) and via exposure to an electron beam (EB). In addition, a full curing step or partial curing step may occur after each step of applying a resin layer. After sufficient curing time, the thermosetting resin layers are substantially polymerized.

Applying Wear-Resistant Layer of Material

Preferably, a layer of translucent, wear-resistant material is applied on top of the cured resin or resins to give the structural panel a hard, scuff and damage-resistant finish suitable for use as a floor panel, wall panel, or countertop. The wear-resistant material is preferably a polymeric material containing a mineral or filler, such as aluminum oxide. Preferred wear-resistant materials include, but are not limited to, urethane acrylates and silicone acrylates.

Figure 2A:
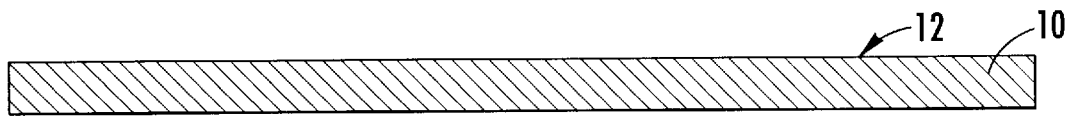
FIGS. 2A–2E illustrate greatly enlarged section views of a process for producing an article of manufacture according to the present invention.
Figure 2B:
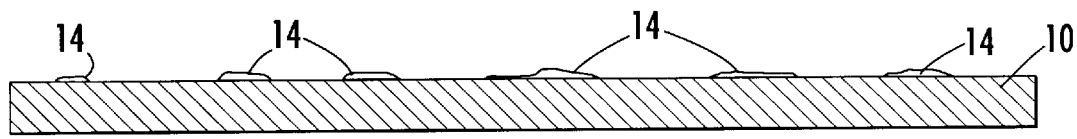
Figure 2C:
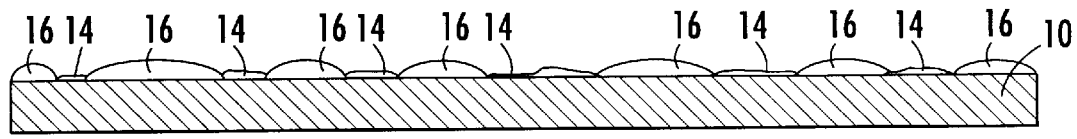
Figure 2D:
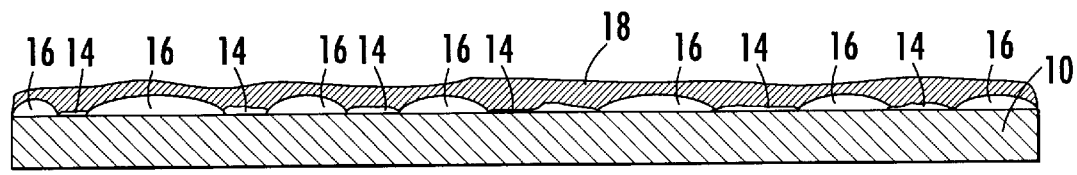
Figure 2E:
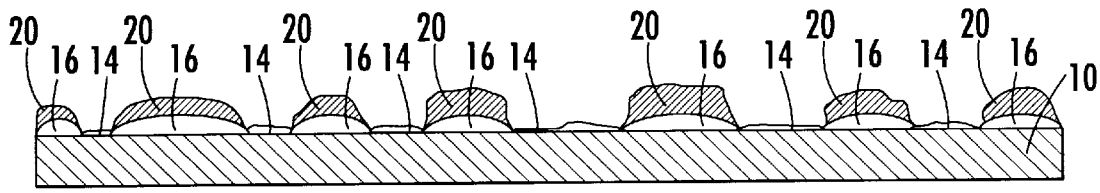

Referring now to FIGS. 2A–2E, greatly enlarged section views of an article of manufacture according to the present invention are illustrated. In FIG. 2A, a substrate 10 is illustrated having a generally rough surface 12. In FIG. 2B, a release material 14 has been applied to the substrate surface 12. In FIG. 2C, a first curable resin 16 has been applied on top of the substrate surface 12 and release material 14. In FIG. 2D, a second curable resin has been applied on top of the first curable resin. Because the two resins are in an "uncured" state, they commingle to form a blended layer of resin 20, as illustrated in FIG. 2E. In addition, because the viscosity and surface tension of the resins are greater than that of the release material, the blended resin "pulls away" from the release material 14 as illustrated. It is to be understood that each separate layer of resin may pull away from the release material to some degree before additional resin is added thereto.

Figure 3:
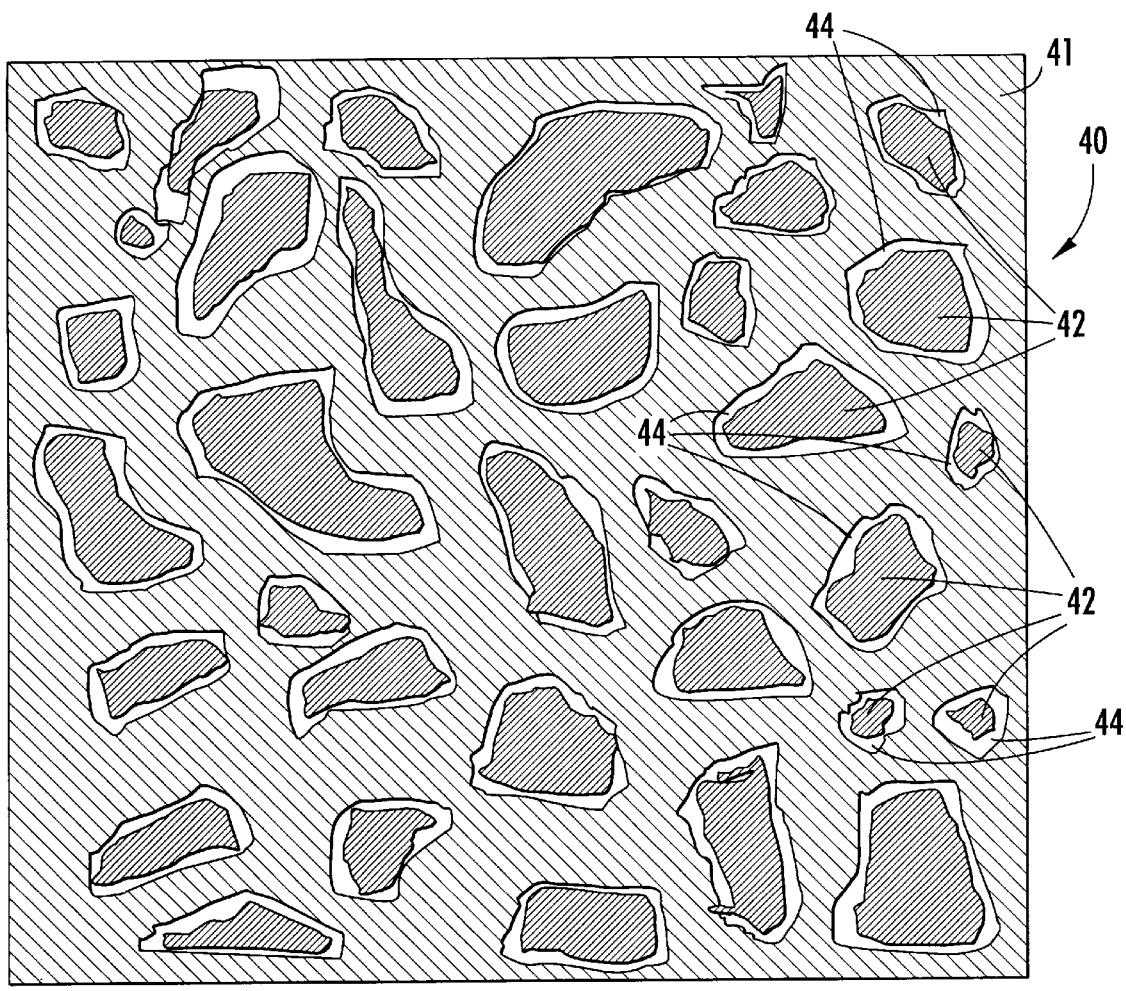
FIG. 3 is a plan view of a decorative article of manufacture produced in accordance with the present invention.

A plan view of a decorative article of manufacture 40 produced in accordance with the present invention is illustrated in FIG. 3. A resin material 42 is pulled away from a release material 44 applied to the surface 41 of the article 40, resulting in the "fish-eye" appearance.

The application of the present invention is broad since attractive and durable resin materials may be utilized. Exemplary decorative structural panels produced by the above process include architectural facing, exterior and interior wall panels, counter tops, tabletops, tiles, containers, moldings, furniture, and the like. As would be understood by those having skill in the art, a plurality of the decorative structural panels may be installed on walls, ceilings, and floors to simulate a continuous ceramic tile surface. Decorative structural panels may be produced to simulate almost any type of surface and may have almost any pattern and color scheme desired when produced according to the processes of the present invention.

The present invention can be further understood by reference to the following specific examples.

EXAMPLE 1

A 20 gauge steel panel was lightly sanded in a random pattern with 320 grit aluminum oxide abrasive paper on an orbital sander. The panel was cleaned with acetone to eliminate oil and other contamination thereon. A silicone rubber stamp with a decorative geometric pattern was coated with a liquid carnauba wax and naphtha. The rubber stamp was pressed against the panel and transferred a thin wax image thereon. The wax image was allowed to dry. Two layers of resin, each having a different color, were applied to the panel on top of the wax image. The two resins had the following compositions:

| Resin #1 | Resin #2 |
|---|---|
| 80% Polyester resin Polylite 31210 (Reichhold Chemicals, Inc.) | 90% Polyester resin Polylite 31210 (Reichhold Chemicals, Inc.) |
| 10% Copper metal flake | 5% Styrene monomer |
| 1% Black pigment | 1% Verdigras pigment (copper oxide) |
| 1% Surfacing agent (H&K R0059 Resin, HK Research Corporation, Hickory, North Carolina) | 1% Surfacing agent (H&K R0059 Resin, HK Research Corporation, Hickory, North Carolina) |
| 5% Styrene monomer | 2% MEKP catalyst (Lupersol DDM-9, Atochem North America, Inc., Buffalo, New York) |
| 2% MEKP catalyst (Lupersol DDM-9, Atochem North America, Inc., Buffalo, New York) | |

Resin #1 was sprayed onto the panel surface to a thickness of 6 wet mils (thousandths of an inch). Immediately thereafter, resin #2 was sprayed on top of resin #2 to a thickness of 4 wet mils.

The resins pulled away from the wax leaving an exposed gray steel pattern and islands of mottled color with bronze, gold, black and blue-gray colors vignetting a gold pattern. The height of the final relief was about 12 dry mils above the surface of the steel panel. The resins polymerized in about 20 minutes. The panel was then baked at 150° F. (66° C.) for 2 hours to achieve a hard durable finish. The resulting decorative article resembled aged, molten metal.

EXAMPLE 2

The same procedure was followed as outlined above in Example 1, except that both resins use 2% surfacing agent which lowered the surface tension causing less pull back from release material. The pattern had a minimum relief texture of 1 to 2 mils. The resulting image after curing was more shadowy and less distinct than in Example 1. In addition, a "halo" image was produced.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A decorative article of manufacture, comprising:
   a substrate having a surface;

a release material applied to portions of the substrate surface, the release material selected from the group consisting of wax, oil, and silicone; and a resin applied to the release material and to portions of the substrate surface not covered by the release material, wherein the resin has a surface tension greater than a surface tension of the release material such that the resin pulls away from the release material and wherein the resin has a first color.

2. A decorative article of manufacture according to claim 1 further comprising a second resin applied to the first resin such that the second resin is commingled with the first resin, the second resin having a second color different from the first color.

3. A decorative article of manufacture according to claim 2 further comprising a third resin applied to the second resin such that the third resin is commingled with the first and second resins, the third resin having a third color different from the first and second colors.

4. A decorative article of manufacture according to claim 1 wherein the release material is applied to portions of the substrate surface in a pattern.

5. A decorative article of manufacture according to claim 1 wherein the release material is applied to portions of the substrate surface randomly.

6. A decorative article of manufacture according to claim 5 wherein the release material has a thickness of less than about 0.0005 inches.

7. A decorative article of manufacture according to claim 5 wherein the resin is a thermosetting resin selected from the group consisting of unsaturated polyesters, acrylics, epoxies, phenolics and polyurethanes, and blends and mixtures thereof.

8. A decorative article of manufacture according to claim 3 wherein the second and third curable resins are thermosetting resins selected from the group consisting of unsaturated polyesters, acrylics, epoxies, phenolics and polyurethanes, and blends and mixtures thereof.

9. A decorative article of manufacture according to claim 5 wherein the resin comprises a plurality of pigments and fillers.

10. A decorative article of manufacture according to claim 5 where in the substrate comprises material selected from the group consisting of metals, plastics, wood, and paper.

11. A decorative article of manufacture according to claim 5 wherein the substrate surface comprises a pattern formed therein.

* * * * *